Oct. 28, 1969  R. L. FRICK  3,474,608
ROTARY MOWER SAFETY BLADE
Filed Feb. 11, 1966  2 Sheets-Sheet 2
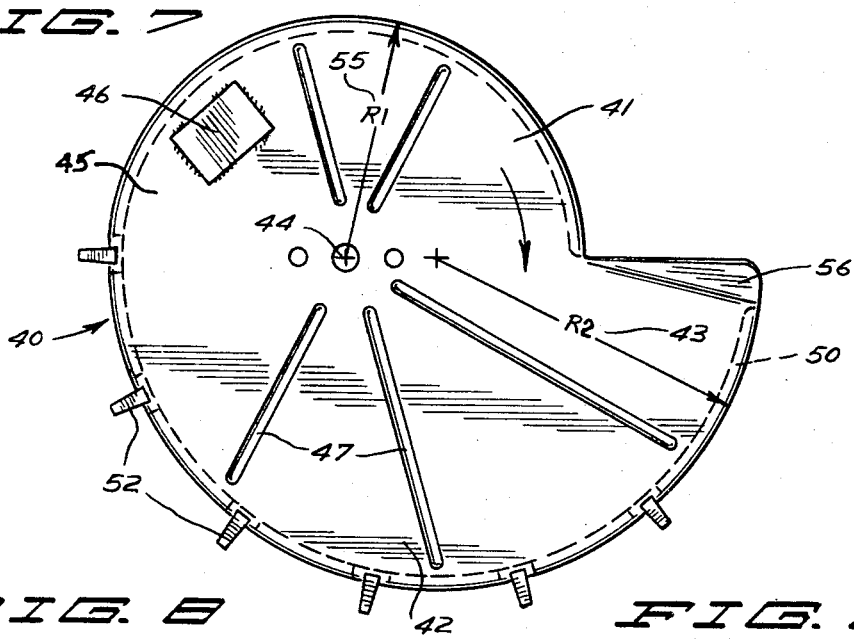
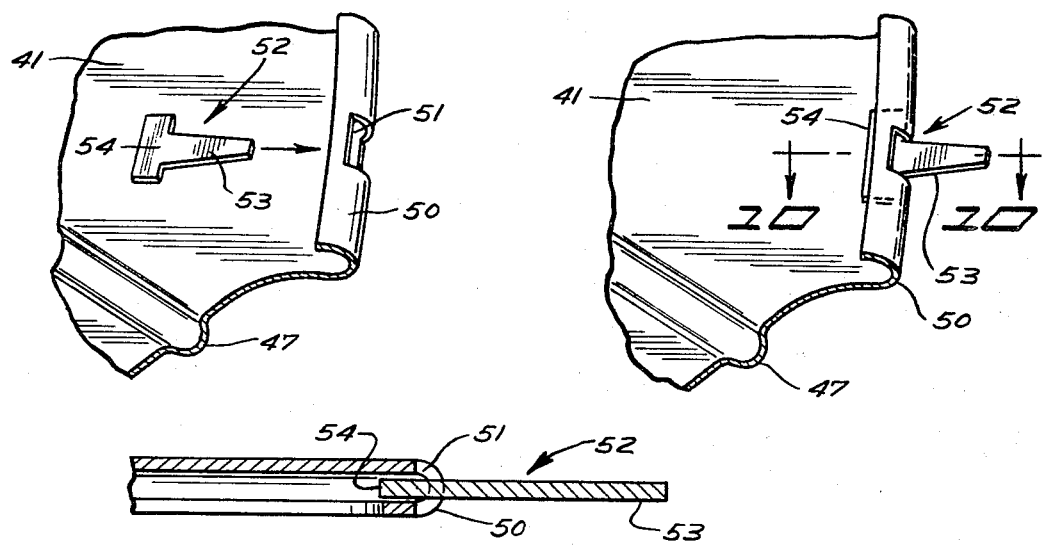
INVENTOR.
ROGER L. FRICK
BY
Dugger Johnson & Westman
ATTORNEYS United States Patent Office 3,474,608
Patented Oct. 28, 1969

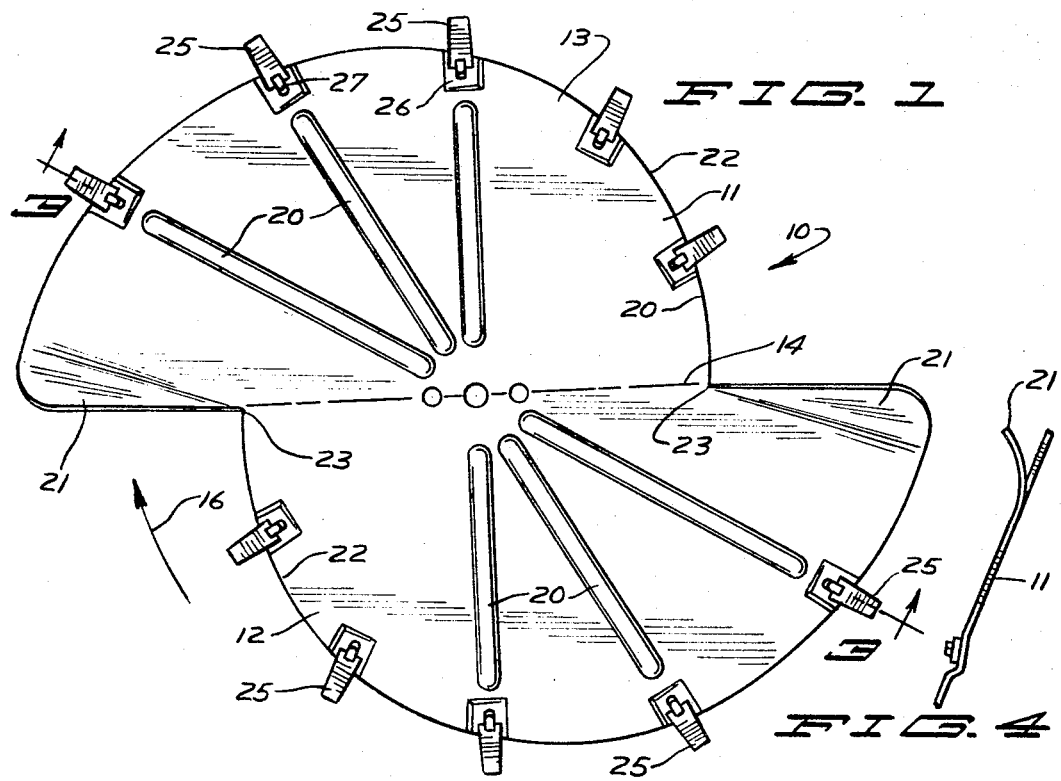
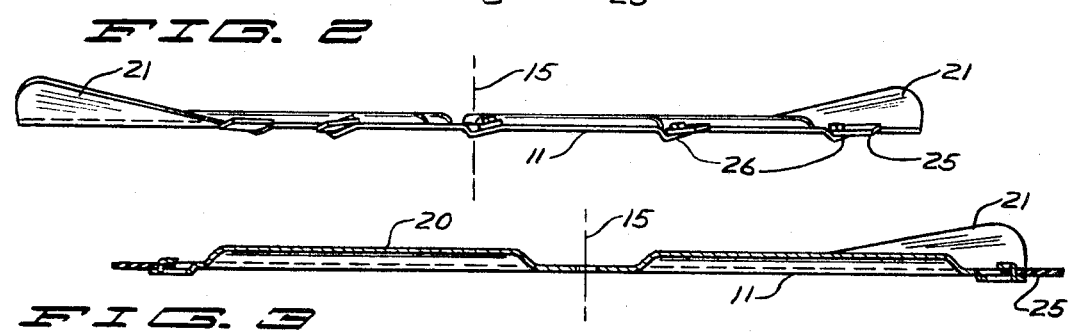
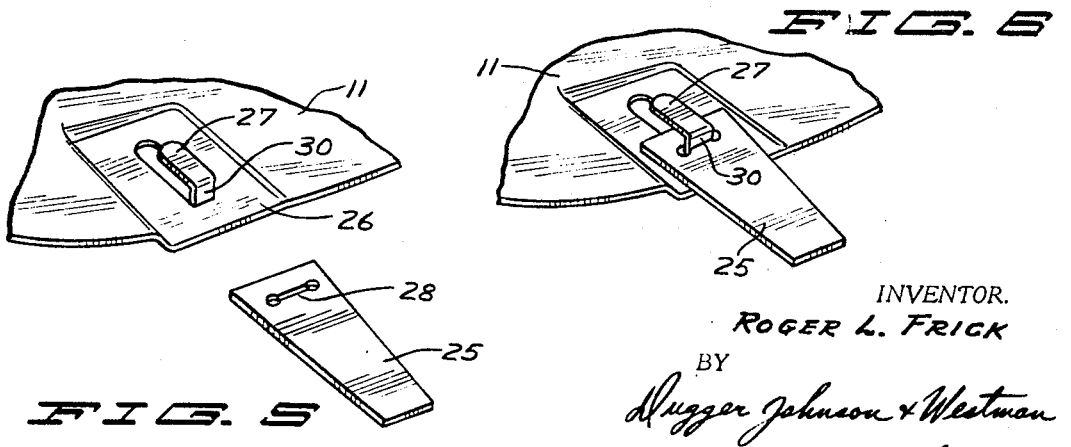

3,474,608
ROTARY MOWER SAFETY BLADE
Roger L. Frick, Minneapolis, Minn., assignor to Rosemount Engineering Company, Minneapolis, Minn., a corporation of Minnesota
Filed Feb. 11, 1966, Ser. No. 526,850
Int. Cl. A01d 55/18, 35/12
U.S. Cl. 56—295
11 Claims

ABSTRACT OF THE DISCLOSURE

A rotary mower blade assembly having a segment with a smoothly curved leading edge portion starting at a minimum radius of rotation and increasing to a maximum radius of rotation, and carrying elastomeric or yieldable cutting elements along this curved leading edge portion.

---

The present invention has relation to blades for rotary mowers and more particularly to a blade which increases the safety of operation of a rotary lawnmower.

A safe rotary lawnmower blade that will not sacrifice cutting ability is needed badly, as evidenced by about 100,000 accidents involving the home lawnmower each year. Several previous blades have been advanced but usually have not worked satisfactorily, either because they are difficult to manufacture, making the blade expensive, or because the underlying theory really did not provide a safe blade.

One blade that has been advanced uses small flexible wires protruding from a circular disc. The wires would supposedly bend out of the way of an object that they strike.

The problem with this type of blade is that upon impacting an object the wires cannot absorb enough kinetic energy to bend because of their high velocity and density. They will merely break off when they strike an object, thereby increasing the hazard because they will fly away at a bullet-like velocity.

The present invention relates to a rotary mower blade which uses a mounting blade, having a plurality of segments, each with a curved leading edge portion extending between minimum and maximum radii on which small yieldable outwardly extending cutting elements are mounted. The yieldable cutting elements are preferably of an elastomeric material which will yield even when the blade is rotating at high speeds and under quite high centrifugal force. The curved leading edge portions of the main blade will tend to move objects out from the blade rather than throwing them at high velocity. The elastomeric cutting elements are mounted so that they will pivot or distort when they strike an object. The small elastomeric cutting elements are mounted so that their edges are below the general plane of the mounting blade to increase the effectiveness of grass cutting. The mounting blade is provided with fins which will create an air current to lift the grass in front of each blade segment and make it stand erect for cutting by the cutting elements.

It is therefore an object of the present invention to present a rotary mower safety blade utilizing a main mounting blade with small yieldable cutting elements at its outer edges.

It is a further object to utilize cutting elements made of an elastomeric material.

It is a still further object of the present invention to use a mounting blade for cutting elements which has a segment with a curved rotationally leading edge having different radii of rotation along its edge length.

Other objects are those inherent in the specification and will be apparent as the description proceeds.

In the drawings,

FIG. 1 is a top plan view of a rotary mower safety blade made according to a first form of the present invention;

FIG. 2 is a side elevational view of the device of FIG. 1;

FIG. 3 is a sectional view taken as on line 3—3 in FIG. 1;

FIG. 4 is a fragmentary side elevational view showing a fin portion on the device of FIG. 1;

FIG. 5 is an enlarged pespective view of a yieldable cutting element used with the device of FIG. 1 and illustrating in particular a means for attaching the element to the main mounting blade;

FIG. 6 is a perspective view of the device of FIG. 5 showing the cutting element in place on the mounting blade;

FIG. 7 is a top plan view of a mower blade made according to a second form of the present invention;

FIG. 8 is a fragmentary perspective view showing the means of attaching cutting elements onto the blade of FIG. 7, as viewed from the bottom of the blade;

FIG. 9 is a view taken substantially in the same position as FIG. 8 showing the cutting element in place in a blade; and FIG. 10 is a sectional view taken as on line 10—10 in FIG. 9.

Referring to FIGS. 1–6 and the numerals of reference thereon, a rotary mower safety blade illustrated generally at 10 includes a blade member or mounting member 11 which, as shown, is a thin non-circular plate like member. The unit is thus a blade which, as shown, has two blade segments 12 and 13 and is symmetrical about a dividing plane illustrated generally at 14. The dividing plane 14 runs through the axis of rotation 15 of the blade.

Conventional mounting holes are provided on the blade for attaching it to a conventional lawnmower motor with suitable adapting hubs, as needed, and rotating the blade in direction as indicated by arrow 16.

The blade member 11 is comprised as a thin platelike member having integral formed radial stiffening ribs 20. Each of the blade segments 12 and 13 has a rotationally trailing bent up lip or fin 21 extending from the outer periphery of the blade segment to the leading corner of the other blade segment. The fin 21 is bent up out of the plane of the blade and as the blade rotates in direction as indicated by arrow 16 this causes an air current to occur that will create a partial vacuum behind the fin 21 and lift the grass blades upwardly so that they stand up when engaged by the rotationally leading edge portion of the other blade segment. The lips or fins 21 also aid in discharge of grass clippings outwardly.

As can be seen, the rotationally leading edge portions of each of the blade segments are indicated at 22 and are defined by smoothly curved edge surfaces of ever increasing radius extending spirally outwardly from the initial starting point indicated at 23 to the fins 21. Each of the blade segments has the same minimum radius at its starting point 23 and the same maximum radius at the outer peripheral edge adjacent the fins 21. As shown, there are two blade segments, but there could be one or more.

A plurality of small cutting elements 25 made of a yieldable material, which will deflect even when the blade is rotating at top speed, are attached to each of the blade segments. The cutting elements 25 can be made of suitable elastomeric material, such as rubber or plastic material and they must have the property of elastically deflecting when striking a hard object.

The cutting elements 25, as shown, are mounted in small offset portions or indentations 26 formed in the blade. These offset portions 26 are indented downwardly so that the outer cutting edges of cutting elements 25 are below the general plane of the blade segments and thus cut the grass without interference from the rotating blade.

The cutting elements could be mounted on the underside of the blade segments or the outer edge of the blade could be rolled or bent downwardly so that the cutting elements were below the general plane of the blade.

The cutting elements can be mounted onto the small offset sections 26 in any usual or preferred manner, such as the use of bolts or rivets which will permit the elements to pivot, or with other conventional fasteners. In the form shown, a tab 27 is partially punched from the blade material forming the offset sections or indentations 26 of the blade and each of the tabs forms an L shaped lug. The cutting elements 25 are provided with small slits 28 (having tear preventing holes at each end) that will slip over a lug 27 and down over a shoulder 30 of the lug. The base portions of the cutting elements 25 will then rest on the top of the indentations 26 and be held thereon by the lugs 27. The cutting elements will lie along the plane of the indentations. The slits 28 are of size so that the cutting elements 25 will slip over the lugs easily and the cutting elements will pivot slightly about the shoulders 30 by distortion of the slits 28 under load. As shown, five of these cutting elements are mounted on each of the blade segments.

The blade assembly is mounted in a conventional mower housing of suitable size and driven by the mower motor in direction as indicated by arrow 16. The small cutting elements 25 will then stand radially outwardly under centrifugal force and the elements will engage the grass and cut it. The cutting elements can have sharpened leading edges, if desired, or if they are made of an extremely thin, tough elastomeric material they can have rounded edges. Severing grass with a thin elastomeric material is very satisfactory, giving a good cutting job and does not entail the expense of beveling or sharpening the leading edge of the cutting elements. The cutting elements are yieldable even when rotated at high speed. The ever increasing radius of the segments of the blade (from minimum to maximum) also tends to push objects away from the blade and out of the mower. Further, the cutting elements themselves are not sufficiently stiff to penetrate a leather shoe, for example, but will twist out of the way or if the mounting is such that they pivot, will pivot out of the way and not damage the foot.

The elastomeric cutting elements are positioned so that each of the blades cuts on a different radius giving a large total effective cutting edge length and minimizing the wear on each of the cutting elements. The mounting of the cutting elements below the general plane of the blade reduces drag and prevents grass from being bruised by the disc. Using the blade segments with minimum and maximum radii with a curved leading edge surface or portion joining the two radii increases the effectiveness of cutting and prevents packing or matting of the grass, which commonly occurs when a circular disc or cutting blade is used.

Cutting elements made of a polyurethane sold by the Du Pont Chemical Company under the trademark "Abrashun" and having a durometer of about 90A appear to be desirable. Harder materials will also work, but do not have the yieldability that this material does. In addition to polyurethane, nitrile rubber, natural rubber and GRS rubber could be utilized for the cutting elements. Unsharpened elements less than .10 inch thick have given good results.

The cutting elements are small and light enough so that they will not throw large objects such as rocks or wire or sticks. Thus the chance of the blade picking up a stone and firing it into something with enough force to do serious damage is minimized. The light cutting elements also have a very low kinetic energy so that if they do fly off the mounting blade, they will quickly slow down by air friction and the energy they have will be dissipated quickly without doing any damage.

Referring to FIGS. 7–10 and a second form of the present invention, a rotary mower safety blade assembly is shown generally at 40. The assembly comprises a blade member 41 which has a first blade segment 42 that is a part-circular disc having a radius R2 indicated at 43. The blade assembly is made up so that it rotates about an axis 44 that is offset from the center point for the radius 43. Thus the segment 42 has a rotationally leading point that has a minimum radius of rotation and a trailing point that has a maximum radius. The points are joined by a peripheral edge portion that smoothly increases from the minimum to maximum radii.

Second counterbalancing blade segment 45 is integral with the segment 42 and is on an opposite side of a dividing plane between the two segments. A counterweight 46 of proper mass can be placed in the proper location for dynamically counterbalancing the segment 42 so that the blade rotates without vibration.

As shown, the blade member 41 is a flat thin disc-like member with a plurality of reinforcing ribs 47. Because the thin disc, when rotating, will have a tendency to cut into objects, particularly if the edges are slightly rough, it is desirable to have a thicker effective edge on the mower blade. In order to utilize the advantages of the lightness of a thin disc, the outer peripheral edge portion is rolled to have a part-circular cross section edge portion 50 shown perhaps best in FIGS. 8, 9 and 10. The roll extends downwardly from the plane of the blade.

Prior to rolling the outer peripheral edge, a plurality of small rectangular openings 51 are punched into the disc adjacent this peripheral edge and positioned so that when the roll 50 is made the openings 51 will be approximately vertically centered on the roll 50.

The openings 51 are of size to receive the main portion 53 of a flexible cutting element 52. As shown, the cutting elements 52 comprise the main portion 53 and an integral head portion 54. The cutting elements are made like a T with a tapered leg. The openings 51 are of size to securely hold the cutting elements adjacent the head element 54 and the head elements are too large to go radially out through the openings 51. The cutting elements 52 can be made of any suitable elastomeric material, as in the first form of the invention and are changed in shape to accommodate a different mounting structure. If desired, the roll portion 50 can be crimped over slightly to clamp onto the heads 54 of the elements after the cutting element has been slipped through the provided openings 51, or the cutting elements themselves can have a small protruberance that would compress sufficiently to permit the cutting element to be slid radially outwardly through the openings 51 and then would snap into place and prevent the cutting element from easily coming back out of the hole.

The cutting elements will be relatively thin elastomeric material and will twist and yield to avoid damaging feet or hands that might accidentially engage the blade.

As can be seen, the counterbalancing segment 45 of the blade is a true part-circle having a radius R1 illustrated at 55. The radius has its center at the axis 44 of the blade. Therefore the segment 45 does not have points at minimum and maximum radii of rotation as does the first segment 42.

A fin 56 is bent up out of the plane of the blade adjacent the trailing edge of segment 42 to provide an outward air flow in the same manner as the previous form of the invention.

It is to be understood that the disc in the first form of the invention can also have a rolled down edge to increase its effective thickness and prevent cutting or slicing of objects which happen to encounter the blade. The blade can be of sufficient overall thickness to prevent damage. It has been found that an edge thickness greater than .1 inch is adequate for safety. The rolled edge is effectively much thicker than this and offers good protection.

Thus, in both forms of the invention, there is at least one blade segment which has an edge portion extending between a minimum radius and a maximum radius when related to the axis of rotation and wherein the minimum radius of the edge of the cutting segment of the blade is rotationally leading the maximum radius portion, thus to effectively form an increasing radius of rotation on the cutting segment. Further, the use of the small elastomeric cutting blades in combination with this increasing radius cutting edge gives very good cutting action. The small counterbalancing portion which has a true part-circular peripheral edge when viewed from the radius of rotation of the blade does not engage the grass to do any of the cutting. The cutting is done by the small elements mounted on the cutting blade segment. These elements also each cut on a different radii to increase the effective cutting edge length, and they are light in weight so they will not do any damage if they come loose.

The rolled over edge protects the small cutting elements from striking large objects or garden edging.

It should also be noted that none of the cutting elements extend out from the center of rotation as far as the trailing edge of the rolled section adjacent fin 56. Thus if a foot or rock goes under the mower, the rolled edge will hit the object before the cutting blades and tend to throw the object out.

What is claimed is:

1. A rotary mower blade assembly comprising a blade adapted for rotation about a center axis, said blade comprising a segment having a curved leading edge portion, the leading edge portion starting at a minimum radius of rotation and increasing to a maximum radius of rotation in a smoothly curved unsharpened edge surface extending through an arc substantially greater than 90°, at least one separate elastomeric cutting element, forming a narrow, substantially radial member, and means mounting said cutting element on said leading edge portion for limited movement with respect to the blade.

2. The combination as specified in claim 1 and a fin bent upwardly out of the general plane of said blade and forming the trailing edge portion of the segment.

3. The combination as specified in claim 1 wherein there are a plurality of elastomeric cutting elements located on the leading edge portion of said segment and the maximum radius of rotation of said elements is less than the maximum radii of the segment.

4. The combination as specified in claim 1 wherein said elastomeric element is less than .10 inch thick.

5. The combination as specified in claim 1 wherein there are at least two segments comprising said blade.

6. The combination as specified in claim 1 wherein the cutting elements are mounted to said blade segments so as to be below the general plane of movement of the blade segment.

7. The combination as specified in claim 6 wherein said blade is a thin plate-like member and has integral reinforcing ribs formed therein out of the plane of the blade and extending generally radially outwardly from the axis of rotation.

8. The combination as specified in claim 1 wherein the outer edge portion of the segment is rolled downwardly from the general plane of the blade.

9. The combination as specified in claim 8 wherein a plurality of holes are provided in the rolled down edge portion, and a separate cutting element extending outwardly through each hole, and means to prevent the cutting element from moving outwardly beyond a predetermined maximum amount.

10. The combination as specified in claim 5 wherein each of said blade segments has a tab fixedly attached thereto adjacent the outer edge portion thereof and extending upwardly out of the plane thereof, said tabs having an upright shoulder portion, and each cutting element having having a slit provided therein of size to receive said tab and said shoulder with the plane of the cutting elements generally parallel to the plane of the portion of the disc to which the tab is attached.

11. The rotary mower blade assembly specified in claim 1 wherein said smoothly curved edge surface extends for substantially 180°.

References Cited

UNITED STATES PATENTS

| 2,225,139 | 12/1940 | Urschel | 56—295 |
| 2,740,249 | 4/1956 | Stearns | 56—295 |
| 2,932,147 | 4/1960 | Beeston | 56—295 |
| 3,087,298 | 4/1963 | Phillips | 56—295 |
| 3,104,510 | 9/1963 | Voigt | 56—295 |

FOREIGN PATENTS

| 237,877 | 3/1962 | Australia. |

OTHER REFERENCES

Armour Research Foundation, Project No. A–687, Development of Quiet Blades for 18-Inch Rotary Type, Power Lawn Mowers, July 29, 1958, pp. 1, 23.

LUCIE H. LAUDENSLAGER, Primary Examiner

U.S. Cl. X.R.

56—25.4, 255